(12) United States Patent
Su (10) Patent No.: US 8,042,253 B2
(45) Date of Patent: Oct. 25, 2011

(54) METHOD OF MANUFACTURING A GOLF CLUB HEAD, OF THE WOOD TYPE, BY ASSEMBLING WELDING, AND FINISH GRINDING THE WELD JOINTS

(76) Inventor: Chi-Hung Su, Tainan Hsien (TW)

(*) Notice: Subject to any disclaimer, the term of this patent is extended or adjusted under 35 U.S.C. 154(b) by 499 days.

(21) Appl. No.: 12/321,692

(22) Filed: Jan. 22, 2009

(65) Prior Publication Data

US 2010/0180421 A1 Jul. 22, 2010

(51) Int. Cl.
*B21D 53/00* (2006.01)
*A63B 53/04* (2006.01)

(52) U.S. Cl. ............. 29/525.14; 473/374; 473/329; 473/342; 473/345; 473/348; 219/121.64; 219/137 R; 228/154

(58) Field of Classification Search ............ 29/428, 29/525.14; 219/121.46, 121.64, 137 R, 91.2; 473/324, 345, 346, 349, 350
See application file for complete search history.

(56) References Cited

U.S. PATENT DOCUMENTS

| | | | | |
|---|---|---|---|---|
| 1,496,936 A * | 6/1924 | Lowe | ............... | 219/137 R |
| 2,659,966 A * | 11/1953 | Turnbull | ............... | 228/154 |
| 4,117,300 A * | 9/1978 | Ricards | ............... | 219/121.64 |
| 5,967,905 A * | 10/1999 | Nakahara et al. | ............... | 473/345 |
| 6,648,774 B1 * | 11/2003 | Lee | ............... | 473/342 |
| 6,749,524 B1 * | 6/2004 | Chen | ............... | 473/342 |
| 6,860,823 B2 * | 3/2005 | Lee | ............... | 473/329 |
| 6,880,222 B2 * | 4/2005 | Matsunaga | ............... | 29/428 |
| 6,918,841 B2 * | 7/2005 | Chen | ............... | 473/342 |
| 6,945,876 B2 * | 9/2005 | Nakahara et al. | ............... | 473/329 |
| 6,949,031 B2 * | 9/2005 | Imamoto et al. | ............... | 473/329 |
| 6,955,612 B2 * | 10/2005 | Lu | ............... | 473/324 |
| 6,989,506 B2 * | 1/2006 | Yabu | ............... | 219/121.64 |
| 7,037,214 B2 * | 5/2006 | Nakahara et al. | ............... | 473/345 |
| 7,063,629 B2 * | 6/2006 | Nakahara et al. | ............... | 473/345 |
| 7,108,612 B2 * | 9/2006 | Nakahara et al. | ............... | 473/329 |
| 7,147,577 B2 * | 12/2006 | Nakahara et al. | ............... | 473/345 |
| 7,169,064 B2 * | 1/2007 | Nakahara et al. | ............... | 473/345 |
| 7,182,699 B2 * | 2/2007 | Matsunaga | ............... | 473/345 |
| 7,258,628 B2 * | 8/2007 | Huang et al. | ............... | 473/342 |
| 7,402,113 B2 * | 7/2008 | Mori et al. | ............... | 473/348 |
| 7,470,201 B2 * | 12/2008 | Nakahara et al. | ............... | 473/345 |
| 2003/0207726 A1 * | 11/2003 | Lee | ............... | 473/342 |
| 2004/0033844 A1 * | 2/2004 | Chen | ............... | 473/329 |
| 2005/0245328 A1 * | 11/2005 | Kouno et al. | ............... | 473/345 |
| 2008/0009364 A1 * | 1/2008 | Chen | ............... | 473/324 |
| 2008/0064523 A1 * | 3/2008 | Chen | ............... | 473/329 |

FOREIGN PATENT DOCUMENTS

JP 06285568 A * 10/1994
* cited by examiner

*Primary Examiner* — David Bryant
*Assistant Examiner* — Jason L Vaughan (57) ABSTRACT

A club head manufacture method has steps of: (a) providing a sole base, a crown cover and a striking face plate; (b) assembling a club head; (c) fore-welding the club head; (d) post-welding the club head; and (e) grinding an outer surface of the club head. When the club head is fabricated, the sole base and the crown cover are respectively mounted on the striking face plate and aligned precisely to save the fabricating time of the club head and increase fabricating accuracy. Therefore, the method can save manufacturing cost. Furthermore, it can increase the accuracy and constancy for the manufacturing processes.

11 Claims, 8 Drawing Sheets

METHOD OF MANUFACTURING A GOLF CLUB HEAD, OF THE WOOD TYPE, BY ASSEMBLING WELDING, AND FINISH GRINDING THE WELD JOINTS

BACKGROUND OF THE INVENTION

1. Field of the Invention

The present invention relates to a method, especially to be a method for manufacturing a club head that can increase welding strength and accuracy.

2. Description of the Prior Arts

Figure 8:
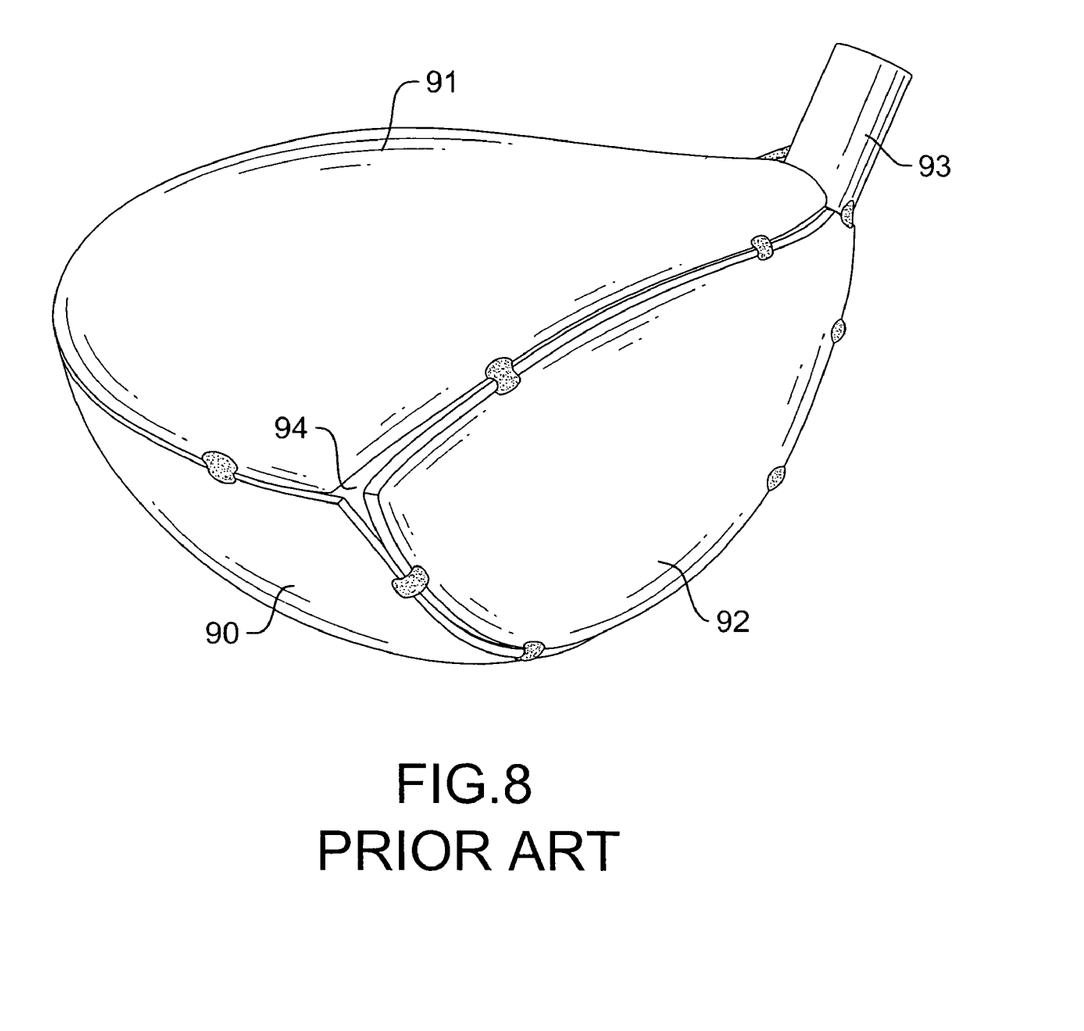
FIG. 8 is a perspective view of the club head in accordance with the prior art.

With reference to FIG. 8, a conventional club head in accordance with the prior art has a sole base (90), a crown cover (91) and a striking face plate (92). The sole base (90) is made by a stamping process and has an edge. The crown cover (91) is made by a stamping process and has an edge. The striking face plate (92) has a top, an edge and a connecting hosel neck (93). The connecting hosel neck (93) is welded on the top of the striking face plate (92). When a worker manufactures the club head with the sole base (90), the crown cover (91) and the striking face plate (92), the edge of the sole base (90), the edge of the crown cover (91) and the edge of the striking face plate (92) are soldered at points to form seams between the edges. So, the worker has to fill and solder the solder on the seams (94) of the club head in order to seal the seam (94) of the club head.

During the club head manufacturing process, manually aligning the components precisely is not easy so that aligning the components consumes much time. Therefore, the structural strength and accuracy of the club head is very poor and in-constant, the manufacturing cost is very high.

To overcome the shortcomings, the present invention provides a method for manufacturing a club head to mitigate or obviate the aforementioned problems.

SUMMARY OF THE INVENTION

The main objective of the present invention is to provide a club head manufacture method that can be used A club head manufacture method in accordance with the present invention has steps of: (a) providing a sole base, a crown cover and a striking face plate; (b) assembling a club head; (c) fore-welding the club head; (d) post-welding the club head; and (e) grinding an outer surface of the club head. When the club head is fabricated, the sole base and the crown cover can be respectively mounted on the striking face plate and aligned precisely to save the fabricating time of the club head and increase fabricating accuracy. Therefore, the method can save much manufacturing cost.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
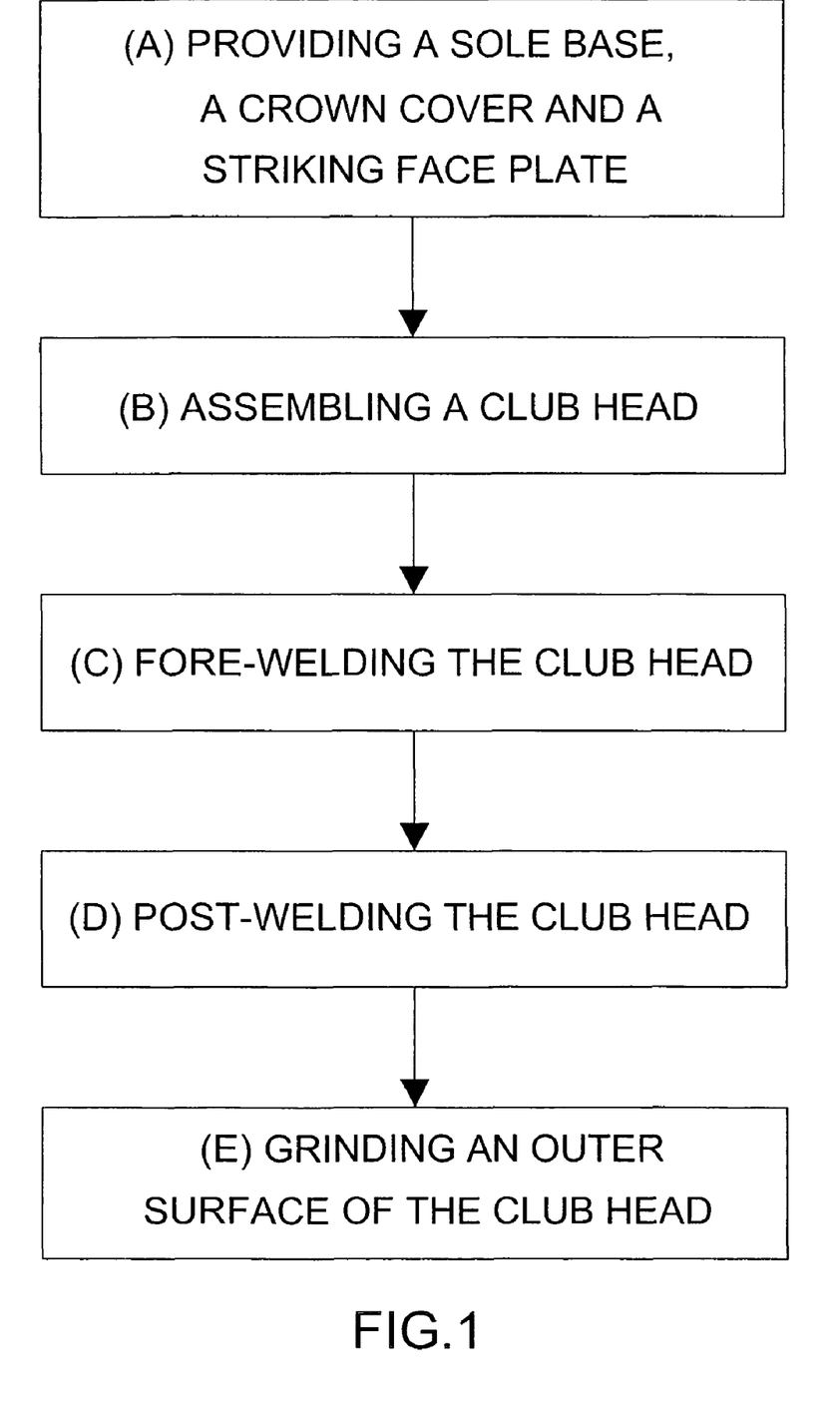
FIG. 1 is a flow chart of a method for manufacturing a club head in accordance with the present invention.

With reference to FIG. 1, a method for manufacturing a club head in accordance with the present invention comprises steps of: (a) providing a sole base (10), a crown cover (20) and a striking face plate (30); (b) assembling a club head; (c) fore-welding the club head; (d) post-welding the club head; and (e) grinding an outer surface of the club head.

Figure 2:
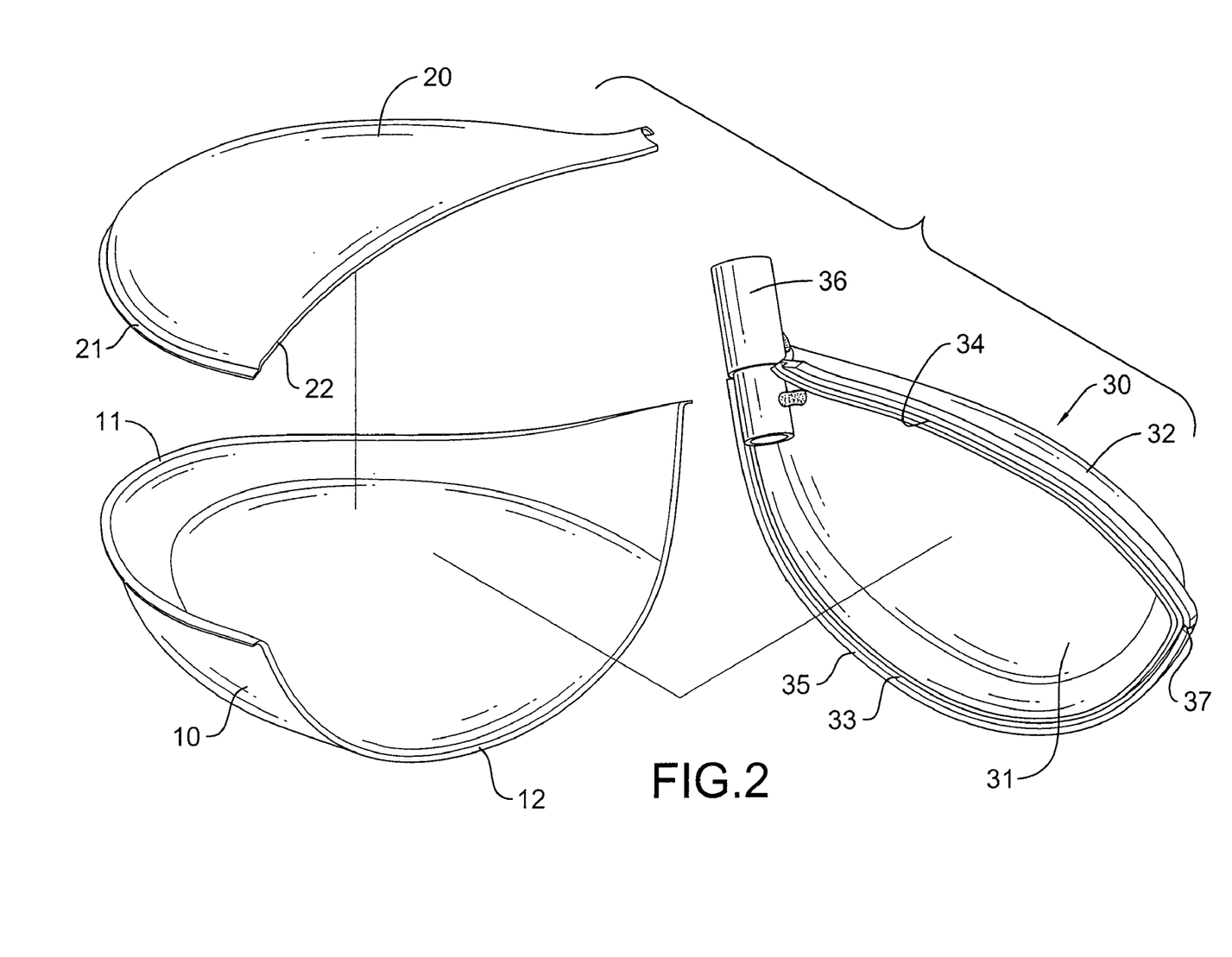
FIG. 2 is an exploded perspective view of a first embodiment of the club head in accordance with the present invention.
Figure 3:
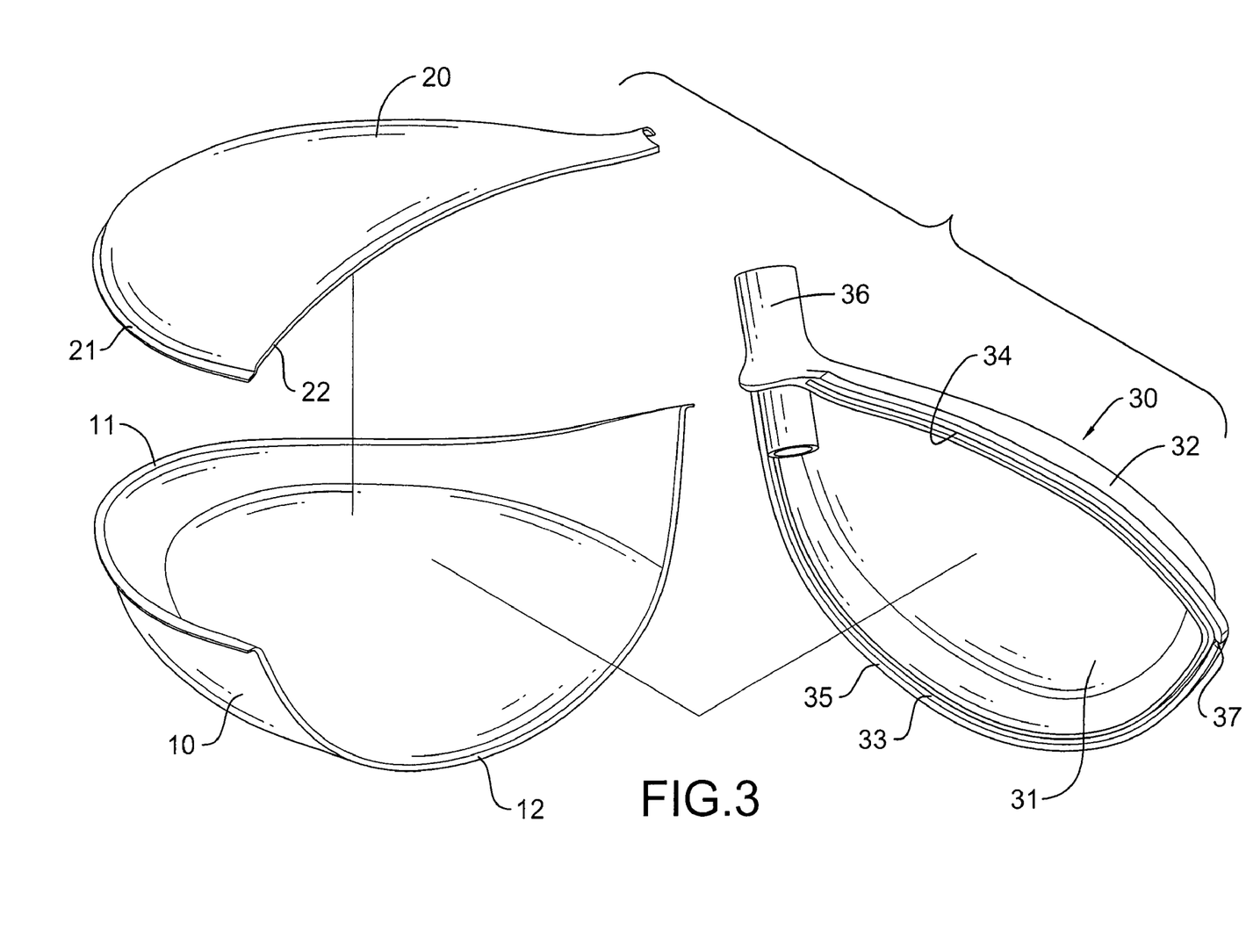
FIG. 3 is an exploded perspective of a second embodiment of the club head in accordance with the present invention.

With further reference to FIGS. 2 and 3, the step of (a) providing a sole base (10), a crown cover (20) and a striking face plate (30) may be implemented by a stamping machine or by a forging machine. The sole base (10) has a top edge, a side edge (12) and a lower lip (11). The lower lip (11) is formed on the top edge of the sole base (10). The crown cover (20) has an outer edge, an inner edge (22) and an upper lip (21). The upper lip (21) is formed on the outer edge of the crown cover (20) and corresponds to the lower lip (11) of the sole base (10).

The striking face plate (30) has an inner surface, a striking section (31), an attaching wall (32), a first alignment groove (33), a second alignment groove (34) and a brim (35) and may have a hosel neck (36).

The striking section (31) has an outer edge. The attaching wall (32) is formed on and abuts the outer edge of the striking section (31) and has a top mounting surface, a bottom mounting surface and an outer surface. The first alignment groove (33) is formed in the bottom mounting surface and corresponds to the side edge (12) of the sole base (10). The second alignment groove (34) is formed in the top mounting surface and corresponds to the inner edge (22) of the crown cover (20). The brim (35) is formed around the outer surface of the attaching wall (32), abuts the bottom mounting surface and the top mounting surface and has an alignment notch (37). The alignment notch is defined transversely through the brim (35) between the first alignment groove (33) and the second alignment groove (34) and communicates with the first alignment groove (33) and the second alignment groove (34).

The hosel neck (36) may be welded on the striking face plate (30) by a welding apparatus as shown in a first embodiment in the FIG. 2 or integrally formed on the striking face plate (30) as shown in a second embodiment in the FIG. 3.

Figure 4:
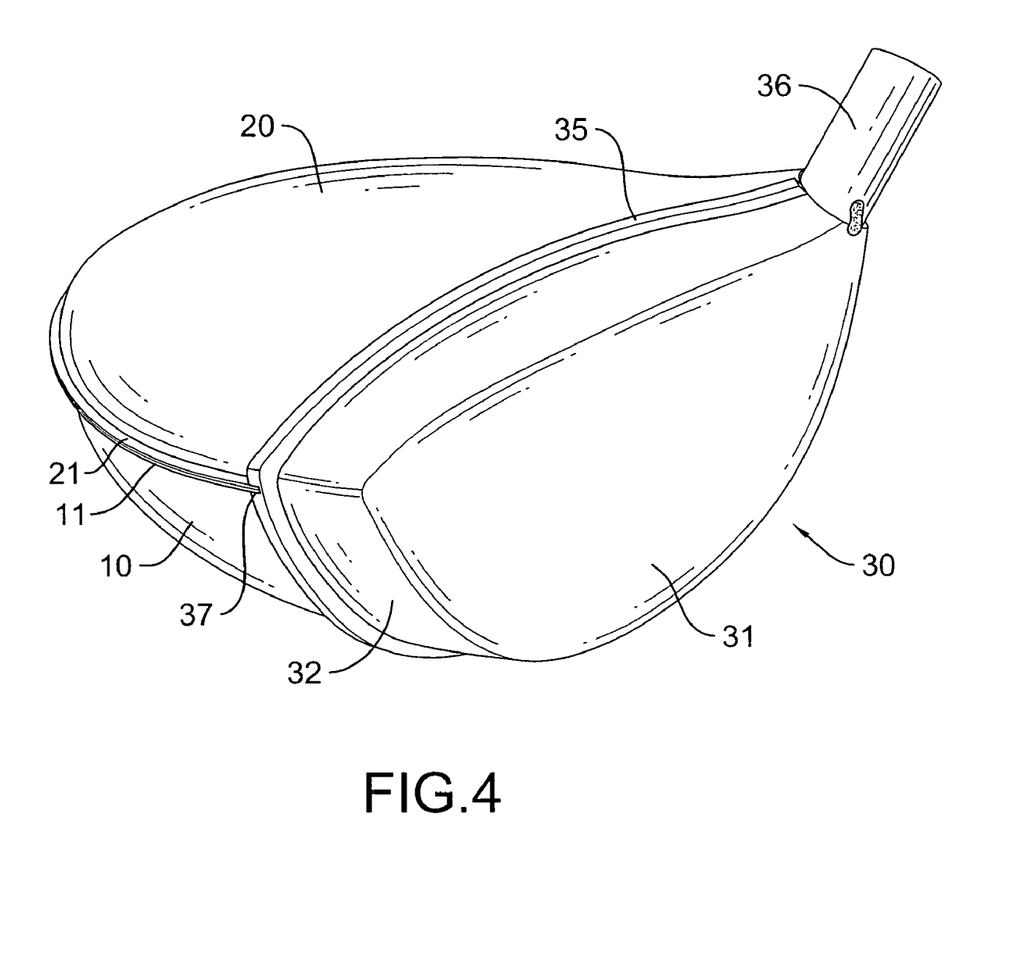
FIG. 4 is a perspective view of the club head in FIG. 2.
Figure 5:
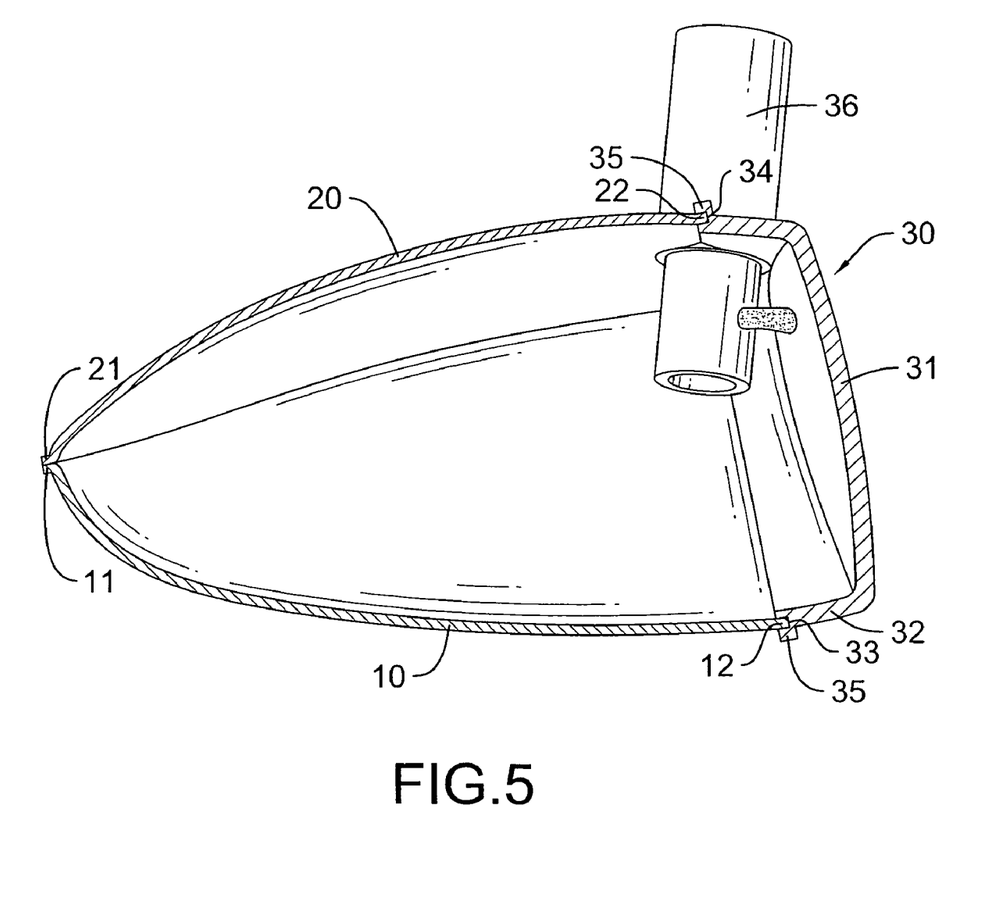
FIG. 5 is a cross sectional side view of the club head in FIG. 2.

With further reference to FIGS. 4 and 5, the step of (b) assembling a club head comprises mounting the sole base (10) and the crown cover (20) on the striking face plate (30) to form a club head. The side edge (12) of the sole base (10) is mounted in the first alignment groove (33) of the striking face plate (30). The inner edge (22) of the crown cover (20) is mounted in the second alignment groove (34) of the striking face plate (30). The lower lip (11) of the sole base (10) and the upper lip (21) of the crown cover (20) are mounted in the alignment notch (37) of the striking face plate (30) and can form a seam between the lower lip (11) and the upper lip (21). The first and second alignment grooves (33, 34) and the alignment notch (37) precisely align the lower lip (11) with the upper lip (21) to facilitate the following welding steps.

Figure 6:
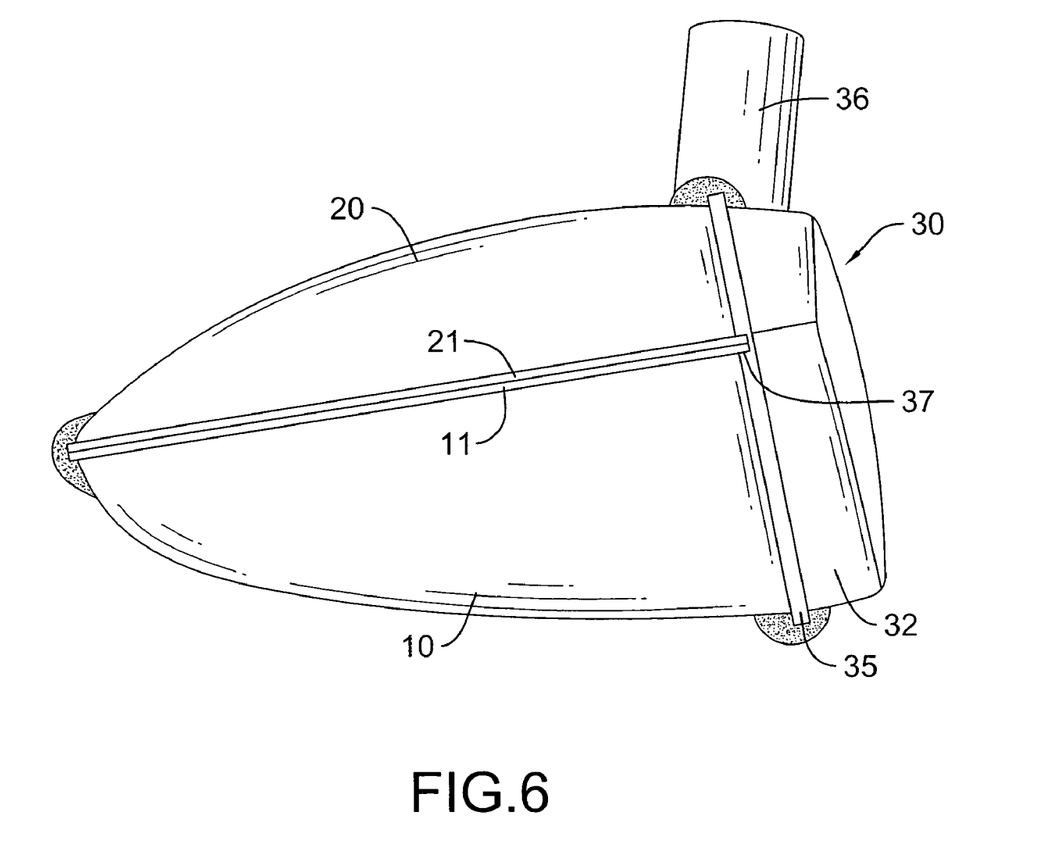
FIG. 6 is a side view of the club head in FIG. 2 after the spot welding step.

With further reference to FIG. 6, the step of (c) fore-welding the club head comprises spot welding the sole base (10) and the crown cover (20) and the striking face plate (30) by a spot welding apparatus to securely attach the sole base (10) and the crown cover (20) to the striking face plate (30).

The step of (d) post-welding the club head comprises welding the sole base (10) and the crown cover (20) and the striking face plate (30) by a welding apparatus that may be an auto welding machine. The welding apparatus melts the lower lip (11), the upper lip (21) and the brim (35) together to seal the seam between the lower lip (11) and the upper lip (21). Therefore, the sole base (10), the crown cover (20) and the striking face plate (30) are combined securely. The welding apparatus may be a plasma welding machine, laser welding machine or argon arc welding machine.

Figure 7:
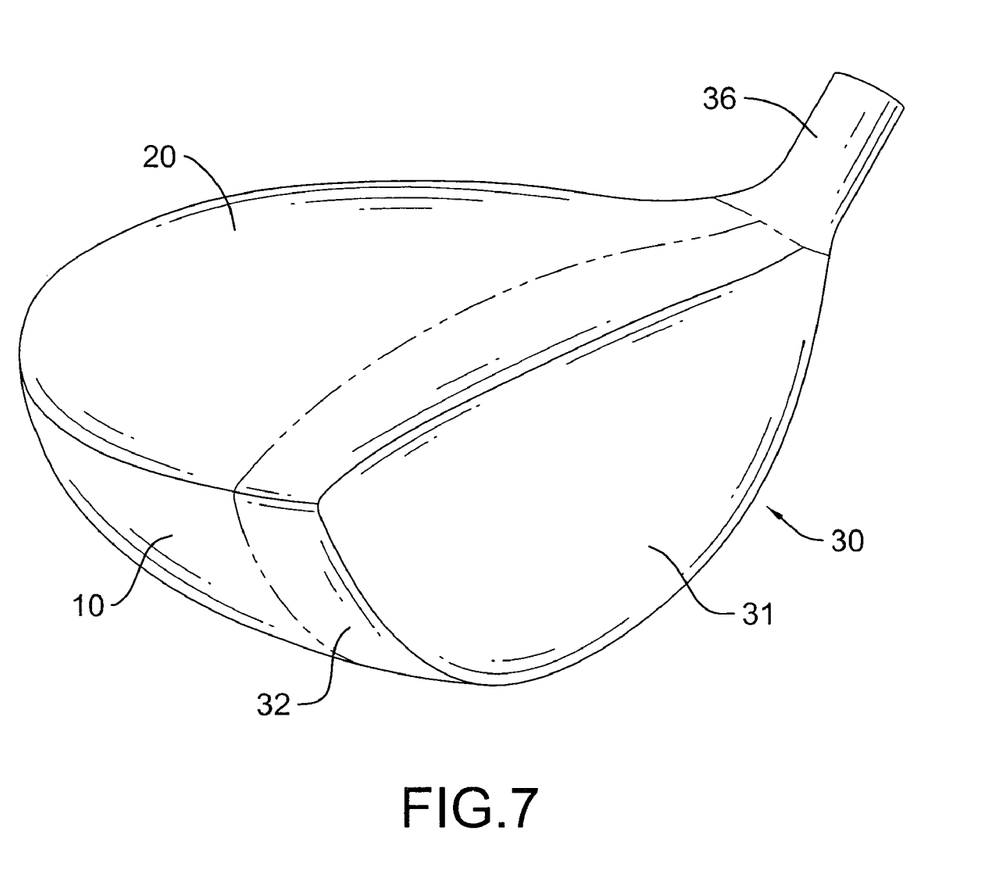
FIG. 7 is a perspective view of the club head in FIG. 6 after the grinding step.

With further reference to FIG. 7, the step of (e) grinding an outer surface of the club head can be performed by a grinding apparatus to make an outer surface of the club head smooth. Uneven and rough melt parts of the club head are ground to be smooth.

When the club head is fabricated, the sole base (10) and the crown cover (20) are respectively mounted on the first alignment groove (33) and the second alignment groove (34) of the striking face plate (30) without further manually align the lower lip (11) and the upper lip (21). Therefore, the fabricating time of the club head is saved and fabricating accuracy is increased. Furthermore, melting the lower lip (11) of the sole base (10), the upper lip (21) of the crown cover (20) and the brim (35) of the striking face plate (30) to seal the sole base (10), the crown cover (20) and the striking face plate (30) by the auto welding machine can save manufacturing cost than conventional artificially welding manners.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method for manufacturing a club head comprising steps of:
   (a) providing a sole base, a crown cover and a striking face plate; wherein
   the sole base having
      a top edge;
      a side edge; and
      a lower lip being formed on the top edge of the sole base;
   the crown cover having
      an outer edge;
      an inner edge; and
      an upper lip being formed on the outer edge of the crown cover and corresponding to the lower lip of the sole base; and
   the striking face plate having
      an inner surface;
      a striking section having an outer edge;
      an attaching wall being formed on and abutting the outer edge of the striking section and having
         a top mounting surface;
         a bottom mounting surface; and
         an outer surface;
      a first alignment groove being formed on the bottom mounting surface and corresponding to the side edge of the sole base;
      a second alignment groove being formed on the top mounting surface and corresponding to the inner edge of the crown cover; and
      a brim being formed around the outer surface of the attaching wall and abutting the bottom mounting surface and the top mounting surface and having an alignment notch being defined through the brim between the first alignment groove and the second alignment groove and communicating with the first alignment groove and the second alignment groove;
   (b) assembling a club head by mounting the sole base and the crown cover on the striking face plate to form the club head; wherein
   the side edge of the sole base being mounted in the first alignment groove of the striking face plate;
   the inner edge of the crown cover being mounted in the second alignment groove of the striking face plate; and
   the lower lip of the sole base and the upper lip of the crown cover being mounted in the alignment notch of the striking face plate;
   (c) fore-welding the club head by welding the sole base and the crown cover and the striking face plate using a spot welding apparatus;
   (d) post-welding the club head by welding the sole base and the crown cover and the striking face plate using a welding apparatus; and
   (e) grinding an outer surface of the club head using a grinding apparatus to make the outer surface of the club head smooth.

2. The method for manufacturing a club head as claimed in claim 1, wherein the step of (a) providing a sole base, a crown cover and a striking face plate is performed using a stamping machine.

3. The method for manufacturing a club head as claimed in claim 2, wherein the striking face plate further has a hosel neck welded on the-striking face plate using a welding apparatus.

4. The method for manufacturing a club head as claimed in claim 3, wherein the welding apparatus is a plasma welding machine.

5. The method for manufacturing a club head as claimed in claim 3, wherein the welding apparatus is a laser welding machine.

6. The method for manufacturing a club head as claimed in claim 3, wherein the welding apparatus is an argon arc welding machine.

7. The method for manufacturing a club head as claimed in claim 1, wherein the step of (a) providing a sole base, a crown cover and a striking face plate is performed using a forging machine.

8. The method for manufacturing a club head as claimed in claim 7, wherein the striking face plate further has a hosel neck welded on the striking face plate using a welding apparatus.

9. The method for manufacturing a club head as claimed in claim 8, wherein the welding apparatus is a plasma welding machine.

10. The method for manufacturing a club head as claimed in claim 8, wherein the welding apparatus is a laser welding machine.

11. The method for manufacturing a club head as claimed in claim 8, wherein the welding apparatus is an argon arc welding machine.

* * * * *